Figure 1:
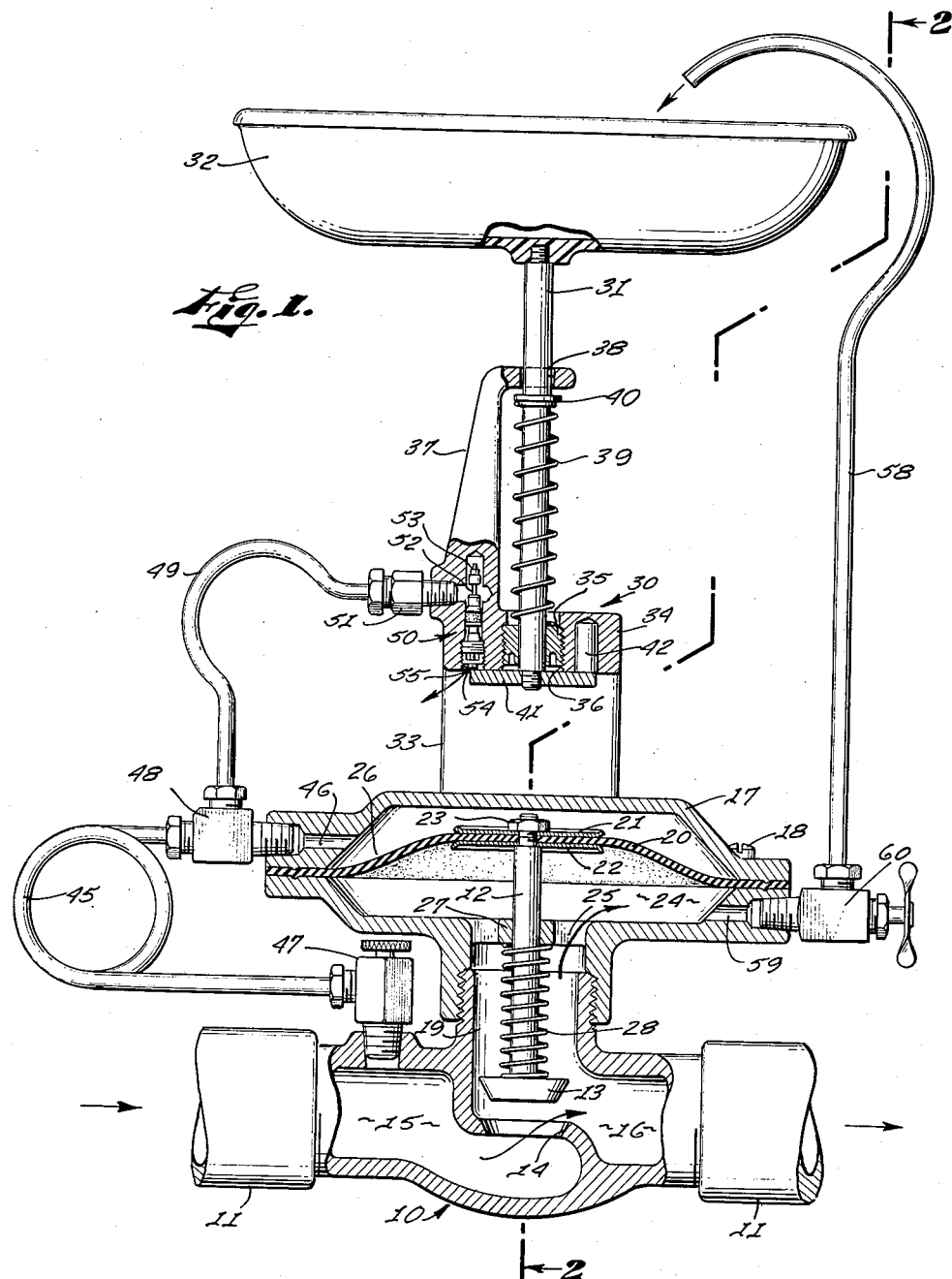

Dec. 20, 1960

J. I. GALLACHER 2,965,117

IRRIGATION CONTROL SYSTEM

Filed March 24, 1958

2 Sheets-Sheet 1

INVENTOR.
JAMES I. GALLACHER
BY

AGENT

Dec. 20, 1960
J. I. GALLACHER
2,965,117
IRRIGATION CONTROL SYSTEM
Filed March 24, 1958
2 Sheets-Sheet 2
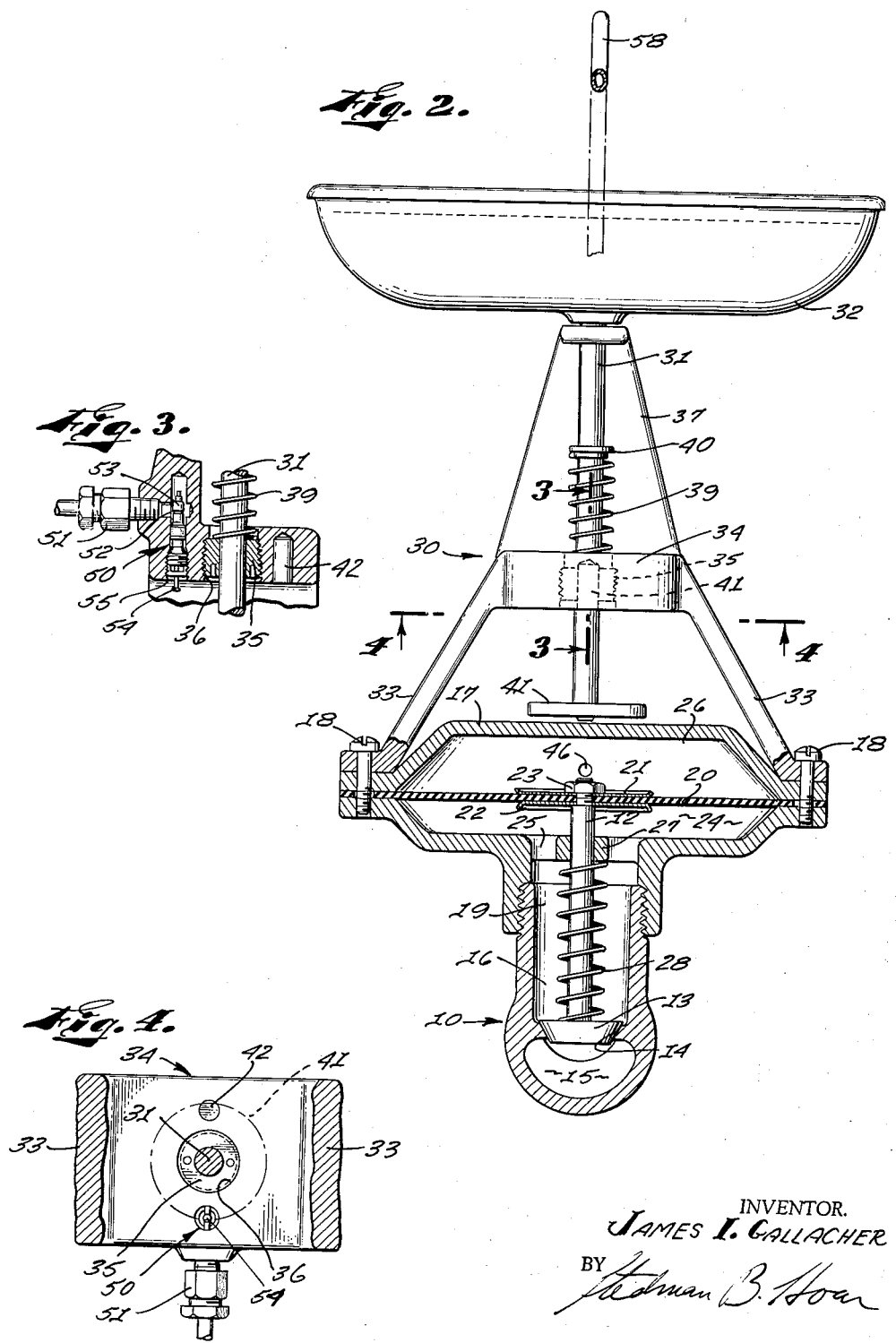
INVENTOR.
JAMES I. GALLACHER
BY
AGENT

United States Patent Office 2,965,117
Patented Dec. 20, 1960

2,965,117
IRRIGATION CONTROL SYSTEM

James I. Gallacher, 180 E. 21st St., Costa Mesa, Calif.

Filed Mar. 24, 1958, Ser. No. 723,164

4 Claims. (Cl. 137—78)

This invention relates to regulative devices for irrigation systems and more particularly relates to a system for controlling the flow of irrigation water with due reference to the humidity of the atmosphere. The idea of automatically increasing irrigation in dry weather and decreasing it in wet weather is not new, but hitherto the devices for that purpose have been unstable and inclined to "hunt." That is, when at the point, say, at which they were supposed to begin to release water to the irrigation system, those devices would release a little water and then shut off, and then release a little more and again shut off, even though dryness called for releasing a larger and more continuous quantity.

It is an object of my invention to provide an irrigation control system having a cycle of operations with considerable sharpness at both ends, changing from full flow to no flow and vice versa rapidly, rather than with a slow leak.

A further object of my invention is to provide an irrigation control system actuated by the weight of water in a receptacle from which the water evaporates in dry weather, but having auxiliary means to hasten the end result of irrigation when approaching a condition calling for irrigation.

A further object of my invention is to provide an irrigation control system actuated as hereinbefore described, in which said auxiliary means serve to delay the shutting off of irrigation until it may be done completely and rapidly.

Another object of my invention is to provide an irrigation control system completely independent of electric systems as I have found any electric system to be unreliable when switched on and off under conditions of moisture and dryness.

In the accompanying drawings, illustrative of a presently preferred embodiment of my invention, but intended only as an example and not as a limitation, Fig. 1 is a view partly in elevation and partly in vertical section showing my improved control system installed in an irrigation conduit, with the main valve open; Fig. 2 is a vertical sectional view on the line 2—2 of Fig. 1, with the direction of view as indicated, but with the main valve closed;

Fig. 3 is a fragmentary vertical section on the line 3—3 of Fig. 2, showing parts which regulate the main valve in the position they assume in Fig. 2; and Fig. 4 is a horizontal sectional view on the line 4—4 of Fig. 2.

Having reference now to the details of the drawings, I have shown in Fig. 1 a valve 10, which may be of the globe-valve type, placed in an irrigation conduit 11 in which the direction of flow is indicated by the arrows. The valve 10 is operated by a stem 12, by which the valve disc 13 is lifted from and pressed down against the valve seat 14. The valve disc and seat divide the valve 10 into an inlet side or chamber 15 and an outlet side or chamber 16. The upper portion of the valve 10 has a head 17 secured to the body of the valve 10 by bolts 18 and enclosing a head chamber 19. A diaphragm 20 is secured to the top of the valve stem 12 by discs 21 and 22 and nut 23, and divides the head chamber 19 into a low pressure side 24 in communication with the outlet side 16 by a passage 25 around the stem 12, and a high pressure side 26. The margins of the diaphragm 20 are held by the bolts 18 between the body of the valve 10 and the head 17, and serve also as a gasket. Between the valve disc 13 and a guide 27 for the valve stem 12, a compression spring 28 is coiled around the valve stem 12, urging the valve disc to a closed position, and the diaphragm 20 to a neutral or flat position.

Mounted on the head 17 is a bracket 30 in which there is mounted, to slide reciprocatingly, a stem 31 which supports a dish-like receptacle 32. For convenience, the bracket 30 may have legs 33 which are secured to the valve by the same bolts 18 which hold the valve head 17. The body of the bracket 30 may be termed a housing 34 as it houses several elements including a bearing plug 35 threaded in a hole 36. The bracket 30 has an upstanding arm 37 spaced from the housing 34 and having a hole 38 aligned with the bearing plug 35. The stem 31 slides in the aligned and spaced hole 38 and plug 35. The stem 31 is encircled by a coil compression spring 39 which bears against the bearing plug 35 and a collar 40 on the stem 31 below the arm 37 and urges the receptacle 32 to a raised position. On the base of the stem 31, below the housing 34 of the bracket 30, a plate 41 is threadedly secured. The plate 41 is designed to come into contact with the lower side of the housing 34 and to limit the lifting of the receptacle 32. The plate 41 is of magnetizable material. Housed also in the housing 34 is a permanent magnet 42, the field of which attracts the plate 41 as the plate approaches it.

A pipe 45 connects the inlet side 15 of the valve 10 with the high pressure side 26 of the valve head chamber 19, entering the chamber through a bore 46. It is desirable that the pipe 45 should include a variable restrictive orifice, and for that purpose a needle valve 47 is shown, but any suitable means of providing such a restriction may be employed. A T-connection 48 is threaded into the bore 46, and from this connection a pipe 49 extends to a second valve 50, housed in the housing 34. The valve 50, as illustrated, is an ordinary pneumatic-tire valve, such having been found quite suitable for the purpose. A nipple 51 connects the pipe 49 with a chamber 52 under the valve head 53. The stem 54 of the valve extends downward and protrudes from the lower face of the housing 34 through a hole 55. As usual with valves of this type, pressure upon the valve stem, thrusting it back into the housing, lifts the valve head 53 and opens the valve. When pressure upon the stem 54 is released, the valve closes again because of the pressure behind it. The plate 41 is of such dimensions that its edge reaches and may press upon the valve stem 54 but does not cover or seal the hole 55.

Another pipe 58 leads from the low pressure side 24 of the valve head chamber 19 to above the receptacle 32, into which it discharges. The pipe 58 enters the low pressure side 24 through a bore 59, into which is fitted a needle-valve fitting 60, to provide—as in the case of the pipe 45—a variable restrictive orifice.

In operation, my improved irrigation control system is responsive to the weight of water in the receptacle 32. Let it be supposed that the receptacle 32 has been filled until its weight has compressed the spring 39 and caused the plate 41 to break away from the magnet 42 and to descend to the position shown in Fig. 2. The valve 50 will accordingly be closed. Water from the inlet chamber 15 will have to travel by the bore 46 rather than by the pipe 49, and will gradually, as permitted by the restriction of the needle-valve 47, build up high pressure above the diaphragm 20, causing the diaphragm to descend and the valve disc 13 to close upon the valve seat 14. Under these circumstances the water is shut off from the irrigation system. There will also be no water in the outlet chamber 16, to travel by the pipe 58 to the receptacle 32.

Now, if dry weather comes and the water in the receptacle 32 evaporates, the receptacle will rise, as urged by the spring 39. As the plate 41 approaches the bottom of the housing 34, it enters the magnetic field of the magnet 42, and the last part of its upward travel is rapid. It quickly and vigorously presses the valve stem 54, opening the valve 50. Because of the restriction of the needle-valve 47, water cannot be supplied through the pipe 45 as fast as it leaks away, and the water above the diaphragm 20 supplies the deficiency, permitting the diaphragm to rise and the main valve to open.

Of course, when the main valve opens, water not only flows through the outlet chamber 16, but through the passage 25 to the low pressure space 24 and thus becomes available to refill the receptacle 32. However, the needle-valve 60 may be set to make this refilling a slow process, and so prolong the period of irrigation. When finally there is enough weight of water in the receptacle to compress the spring 39, the plate 41 will still be held up by the magnet 42. A surplus of water is thus required to be in the receptacle 32 before irrigation is shut off. Also, when the plate 41 does break away from the magnet 42 and release the valve stem 54, and pressure starts to build up again above the diaphragm 20, this pressure is aided in closing the main valve by the spring 28, causing a more rapid and certain closing than would otherwise be achieved.

I claim:

1. An irrigation control system comprising: a conduit for water; a valve dividing said conduit into an inlet side and an outlet side, and having a head chamber; said valve having a stem extending into said head chamber and being operated by reciprocation of said stem; a diaphragm on said stem dividing said head chamber into a low pressure side in communication with said outlet side, and a high pressure side; a first pipe connecting said inlet side of said valve with said high pressure side of said head chamber; a housing disposed above said valve and secured thereto; a second valve in said housing and having a reciprocating stem by which said second valve is operated normally extending outwardly from said housing so as to expose an end thereof; a second pipe connecting said first pipe with the upstream side of said second valve; a receptacle open to the atmosphere; a third pipe connecting said low pressure side of said head chamber with said receptacle, for filling said receptacle; means, including a reciprocably mounted rod on which said receptacle is supported and a spring, opposing the weight of said receptacle; a plate of magnetic material on said rod, reciprocable thereby to contact and cause reciprocation of said stem of said second valve; and a magnet in said housing for attracting said plate in the direction of the spring force.

2. An irrigation control system comprising: a conduit for water; a valve in said conduit for controlling flow therethrough; means housing a diaphragm by which said valve is operated; means for injecting water under pressure on one side of said diaphragm, to close said valve; escape means communicating with said injecting means, having an open position for the escape of said water and a closed position; a receptacle for water, open for evaporation, and spring-urged in a direction opposing the weight of said receptacle; means communicating with said receptacle and connected with the downstream side of said valve, and operative when the valve is open, for filling said receptacle; means of magnetic material engageable with said escape means and responsive to movement of said receptacle for operating said escape means to an open position; and stationary magnetic means adjacent said movement responsive means for assisting said movement responsive means to cause said escape means to assume said open position.

3. An irrigation control system comprising: a conduit for water; a valve in said conduit controlling flow therethrough; a receptacle, mounted to move vertically; a pipe from the outlet side of said valve to said receptacle, for filling said receptacle; means connected with said receptacle, responsive to a change of weight of said receptacle for changing the elevation of said receptacle; means housing a diaphragm operatively connected to said valve and having one side connected to the inlet side of said valve and responsive to an increase in pressure on said one side to close said valve, and responsive to a release of said pressure to open said valve; a second valve connected to said one side of said diaphragm; and means operatively connected to said receptacle and engaging said second valve and responsive to a lowering of said receptacle for permitting closing of said second valve and increasing pressure on said one side of said diaphragm, and responsive to a raising of said receptacle for opening said second valve and releasing said pressure.

4. An irrigation control system as set forth in claim 3 wherein said means for closing and opening said second valve comprises magnetic material and a magnet is fixedly mounted adjacent said magnetic material to counteract in part the valve closing action of said closing and opening means and to supplement the valve opening action of said closing and opening means.

References Cited in the file of this patent

UNITED STATES PATENTS

| 1,606,356 | Fisher | Nov. 9, 1926 |
| 1,822,901 | Mulhall | Sept. 15, 1931 |
| 2,746,471 | Cobb | May 22, 1956 |
| 2,766,070 | Park | Oct. 9, 1956 |